United States Patent [19]

Gryskiewicz

[11] 4,343,358
[45] Aug. 10, 1982

[54] LASER SLOTTED PLASTIC WELL SCREEN

[75] Inventor: Gregory A. Gryskiewicz, North St. Paul, Minn.

[73] Assignee: UOP Inc., Des Plaines, Ill.

[21] Appl. No.: 119,279

[22] Filed: Feb. 7, 1980

[51] Int. Cl.³ .................. B23K 9/00; E21B 43/08
[52] U.S. Cl. .................... 166/227; 166/231; 219/121 LL
[58] Field of Search ............... 166/227, 236, 205, 232, 166/231; 219/121 LL, 121 LP, 121 LN

[56] References Cited

U.S. PATENT DOCUMENTS

| | | | |
|---|---|---|---|
| 447,882 | 3/1891 | King | 166/227 |
| 2,275,080 | 3/1942 | Kelly | 166/227 UX |
| 2,933,137 | 4/1960 | D'Audiffret et al. | 166/227 X |
| 3,327,865 | 6/1967 | Thompson | 166/227 X |
| 3,358,781 | 12/1967 | Cotton | 166/227 X |
| 3,431,975 | 3/1969 | Blake | 166/227 |
| 3,594,261 | 7/1971 | Broerman | 219/121 LL X |
| 3,617,683 | 11/1971 | Preresford et al. | 219/121 LP X |
| 4,167,662 | 9/1979 | Steen | 219/121 LN X |

FOREIGN PATENT DOCUMENTS

| | | | |
|---|---|---|---|
| 6830 | 1/1980 | European Pat. Off. | 166/227 |
| 750783 | 8/1933 | France | 166/227 |

Primary Examiner—Stephen J. Novosad
Attorney, Agent, or Firm—James R. Hoatson, Jr.; Barry L. Clark; William H. Page, II

[57] ABSTRACT

Plastic well screen has tapered, undercut slots formed by a laser beam focused through a lens having its focal point located at or slightly away from the surface of the plastic cylinder being slotted so that the laser beam diverges as it passes through the plastic. The cylinder is rotated and simultaneously moved axially relative to the laser beam to produce a series of transverse slots. In one embodiment, the laser beam is interrupted to provide continuous longitudinal support portions in the cylinder. In a modified embodiment, the cylinder has integral internal ribs which remain intact even though the laser is operated continuously to remove surface material located between the ribs and the laser beam.

2 Claims, 5 Drawing Figures

LASER SLOTTED PLASTIC WELL SCREEN

BACKGROUND OF THE INVENTION

The invention relates to well screens, and particularly to plastic well screens which are sometimes used in preference to conventional welded metal wire screens of the type disclosed in Johnson Patent 2,046,458 to achieve lower cost or to provide a particularly non-corrosive material compatibility with the fluid being collected.

Plastic screens can be made by wrapping plastic wire around rods and welding it with ultrasonic energy or solvents, for example, but low cost plastic well screens are generally manufactured from plastic pipe or custom designed tubular plastic extrusions. The custom extrusions usually have ribs on the inside for longitudinal strength. External slots may be cut with a moving saw blade, by rotating the extrusion and using a stationary cutting tool, or by a combination of these. This results in a straight sided slot, and, because of the geometry of the saw blade or because of the strengthening ribs, a relatively low percentage of open area. Cutting internal slots with a cutter having tapered sides would provide slots having tapered walls and has been done in a metal screen having longitudinal external ribs. However, internal cutting is very difficult and would also considerably reduce the open area of the slots due to the cutter geometry. Small slot screens are somewhat difficult to fabricate because the slot is sized by the width of the cutting tool. In the 0.010" slot range, cutting tools are weak and difficult to control. Also, externally sawn slots, having straight sides, do not provide the self-clearing or non-clogging advantage of slots with tapered sidewalls.

SUMMARY

It is among the objects of the present invention to provide a low cost plastic well screen with self-clearing, tapered slots which can be made with a uniform slot width as small as about 0.008–0.012". The new plastic screen is made using available laser technology to "cut" a slot in a pipe or tube, made of a plastic such as ABS, PVC, polyethylene, or polypropylene, for example. A laser directed at the plastic surface causes the material to vaporize, leaving a uniform slot. Because of the optical nature of a laser beam, the resulting slot has an undercut, self-cleaning, inverted "V" shape. By setting the laser beam focal point at the surface of the plastic, it should be possible to obtain a minimum slot of 0.008 to 0.010 inches. If the focal point is raised above the surface, the result is a wider beam at the surface and a larger slot. In all cases the slot widens inside the material, preferably with a relief angle of approximately 3° to 5°.

When applied to plastic pipe this design permits a larger open area for the same width of slot and degree of support than a saw cut screen, because the laser beam cuts straight in toward the center of the extrusion. There is no substantial loss of open area at the ends of the slots as would be the case if a circular saw blade were used. This laser technique can also be applied to an internally ribbed extrusion. The cutting speed can be set so the laser will cut through the wall of the extrusion, but not have enough power to penetrate the rib. Because the width of the "V" slot is larger on the inside of the extrusion, the ribs do not interfere with open area.

Suitable apparatus for producing and focusing a laser beam is commercially available and need not be described herein except to say that it would have to be mounted relative to the cylinder to be slotted in such a way that relative longitudinal movement between the cylinder and laser beam can take place during the slotting operation. The movement could be continuous so as to produce transverse slots lying on the locus of a helical line superimposed on the slotted length of the screen. The movement could also be intermittent so as to produce a plurality of distinct annular slots. Where the cylinder is not internally ribbed for support, the laser beam must be periodically interrupted at least three times per revolution of the cylinder so as to leave support portions of the cylinder without slots. The invention also contemplates that a laser could be used to provide an undercut to a sawn slot. Such an operation could be accomplished at great speed since little material would need to be removed.

DESCRIPTION OF THE PREFERRED EMBODIMENTS

Figure 1:
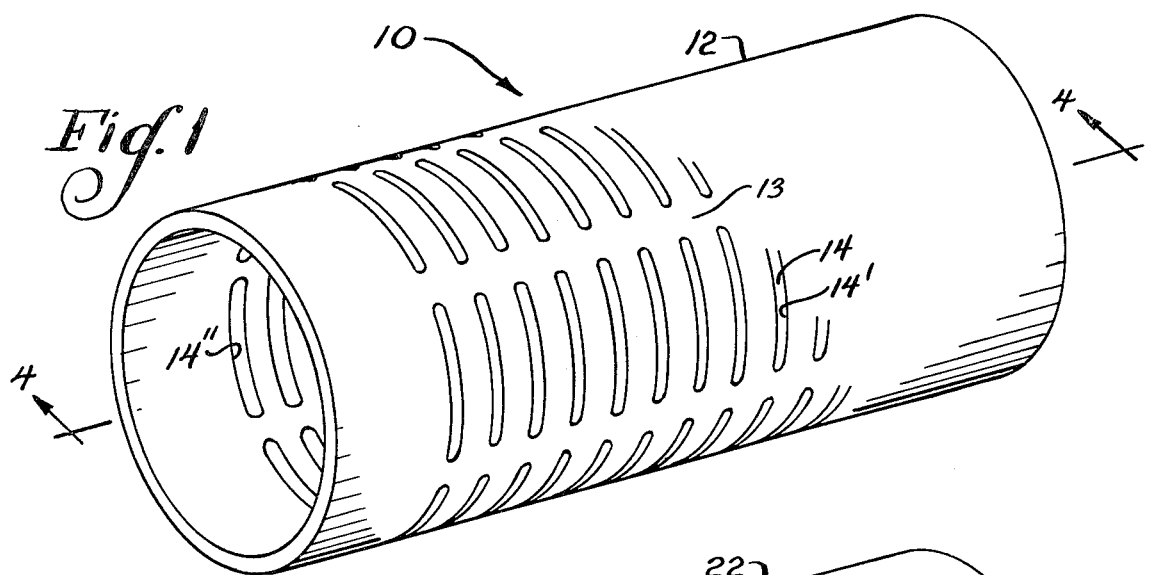
FIG. 1 is an isometric view of a plastic well screen made with a periodically interrupted laser beam.
Figure 4:
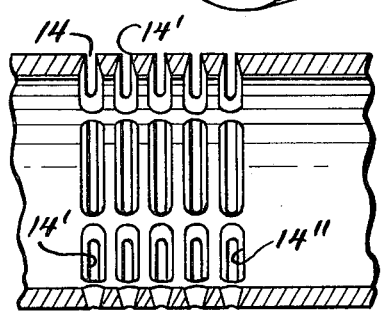
FIG. 4 is a fragmentary axial cross-section taken on line 4—4 of FIG. 1.

Referring to FIG. 1, a preferred embodiment of my invention is illustrated, which comprises a slotted plastic well screen indicated generally at 10. The screen 10 consists of a length of plastic pipe or tube 12 which contains a plurality of slot openings 14 which are positioned at spaced locations both axially and circumferentially of the tube 12. The width and length of the portions 14' of the openings 14 which intersect the plane of the outside wall of tube 12 are smaller than the width and length of the portions 14" which intersect the plane of the inside wall of tube 12. As best seen in the cross-sectional view of FIG. 4, the slots 14 are of an inverted "V"-shape, a shape which makes them tend to be self-cleaning and non-clogging. The slots are shown as being annular but could obviously be helical.

Figure 2:
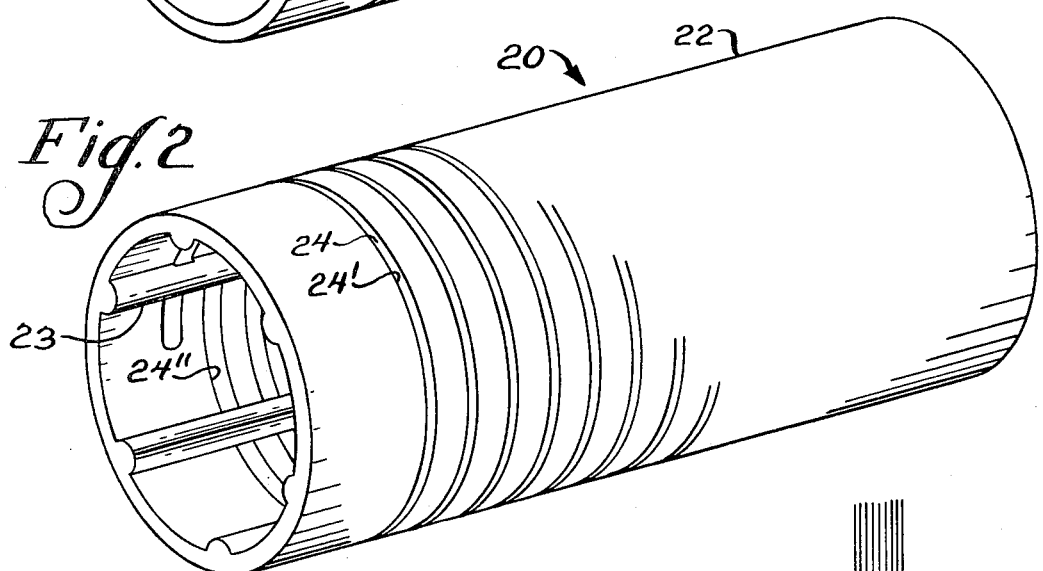
FIG. 2 is an isometric view of a plastic well screen made with a continuously operating laser beam.
Figure 5:
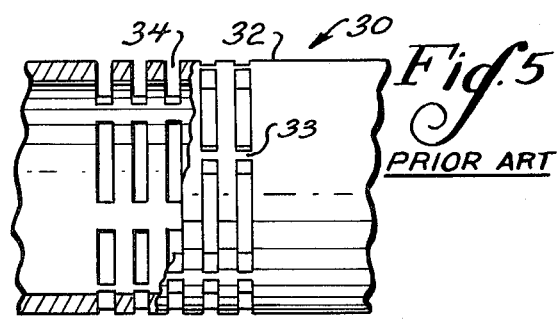
FIG. 5 is a fragmentary cross-section of a prior art saw-slotted screen.

The modified embodiment 20 in FIG. 2 comprises an extruded tube or cylinder 22 having a smooth outer surface and a plurality of integral ribs 23. A helical slot 24 is of an inverted "V" shape having a narrower width 24' on the outer surface of the cylinder 22 and a wider width 24" on the inner surface of the cylinder 22. The self-cleaning "V"-shaped slot 24 is much more desirable than the straight sided slots 34 shown on the prior art saw-slotted screen 30 of FIG. 5. The slots 34 would generally be formed by a saw blade engaging the exterior surface 32 of the tube from which the screen is formed and thus, could not have the inverted "V" shape. The slots 34 would, when formed by an external saw blade, have a much larger peripheral extent on the outside of the tube than on the inside due to the geometry of the blade. Consequently, if the slots 14 in the FIG. 1 embodiment and the slots 34 in the FIG. 5 embodiment have the same minimum width but are spaced circumferentially so as to leave the same amount of material for support in the regions 13 and 33 between the slots, the available open area of the screen 30 will be less than the available open area of the screen 10.

Figure 3:
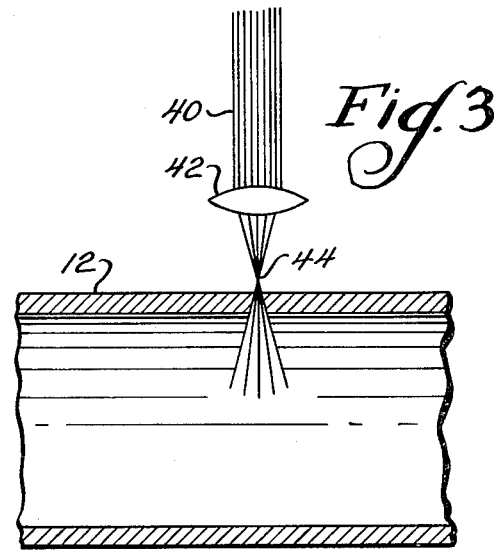
FIG. 3 is an axial cross-section of a tube illustrating the relationship between the tube and a focused laser beam.

The screens 10 and 20 are preferably made by the action of a laser beam 40 as schematically indicated in FIG. 3. The beam 40 would be focused by a lens system 42 at a point 44 which is on or spaced just above the surface of a cylinder 12, the exact spacing determining the width of the resulting slot which is preferably very narrow and in the range of about 0.008-0.012". Although such narrow widths are preferred for the most effective screening of particulate matter, slots as wide as 0.020-0.030" are also suitable for many well screen applications. To obtain wider slots, the lens system 42, and thus the point of focus 44, would be moved away from the surface 12. Since extruded tubes cannot be manufacutured in a perfectly concentric fashion, the lens system 42 is preferably mounted on a movable support (not shown) which can, through cam followers or similar structure, maintain the point of focus 44 at a fixed distance from the tube surface as the tube is rotated during the slotting operation.

I claim as my invention:

1. A plastic well screen comprising an integral, one piece wall portion having a cylindrical outside surface and a hollow interior, said wall portion having a longitudinally extending series of elongated transverse slots along its circumference which permit fluid to flow from outside said wall portion to said hollow interior, said slots being characterized in that the generally radially extending portions of the wall portion which define their side surfaces are angularly divergent in an inward direction and in that each of said transverse slots has a minimum width of opening on the outside surface of said wall portion which is less than about 0.020 inches, said wall portion including at least three, circumferentially spaced, longitudinally extending support portions which extend, uninterrupted, for the entire length of the screen and wherein said longitudinally extending support portions comprise rib portions projecting inwardly from said wall portion to provide axial strength to said screen and wherein said transverse slot portions overlie said rib portions.

2. The plastic well screen of claim 1 wherein each of said transverse slots has a maximum width of opening on the outside surface of said wall portion which is no greater than about 0.012 inches.

* * * * *